Nov. 29, 1955     H. M. KROFT ET AL     2,724,971

VIBRATION DETECTING APPARATUS

Filed Feb. 13, 1952

WITNESSES:
Robert C. Baird
C. F. Oberhein

INVENTORS
Herbert M. Kroft &
Milton P. Vore.
BY
Paul E. Friedemann
ATTORNEY

United States Patent Office 2,724,971
Patented Nov. 29, 1955

2,724,971
VIBRATION DETECTING APPARATUS

Herbert M. Kroft, Inglewood, Calif., and Milton P. Vore, Catonsville, Md., assignors to Westinghouse Electric Corporation, East Pittsburgh, Pa., a corporation of Pennsylvania Application February 13, 1952, Serial No. 271,322

5 Claims. (Cl. 73—462)

This invention relates generally to apparatus for measuring vibration and more in particular to an apparatus of this type involving an improved vibration detecting system for measuring vibration along a single path.

As a general rule in the measurement of vibration, it is desirable to measure a component of the vibratory movement acting along a single path. When balancing rotating bodies, such an approach to the problem minimizes complications in determining the actual magnitude and the location of the unbalance. In such a procedure, it is usually necessary to measure vibratory movement at two different points.

This general balancing procedure is applied in the art of balancing rotors such as, for example, motor rotors. The equipment for balancing a motor rotor usually involves a machine having a pair of coaxially disposed bearing supports which are mounted upon the base structure or frame of the machine by means of flat leaf springs which are stiff in all directions except one, so as to limit vibratory movement to a single path. In practice, this path is usually in a horizontal plane. To balance the rotor, the rotor shaft is journaled at its ends in the respective bearings and the rotor is rotated at high speed by means of an external drive. Any unbalance condition in the rotor will cause vibratory movement of the two bearings in varying degrees of amplitude and time relationship, depending on the condition of unbalance. This vibratory movement of the bearings by reason of the leaf spring mounting mentioned above results in vibration of the leaf spring mounted bearing supports along the respective single paths of freedom.

Suitable vibration pickups are disposed in the respective paths of movement of the bearing supports to be operated thereby. If these vibration pickups are of the electrical type, their electrical outputs may be used in cooperation with the electrical output of a sine wave generator connected to the rotor shaft and operated at running frequency to produce an indication of the vibratory movement at the respective bearings on a meter, the angle of unbalance being determined by comparison with the sine wave voltage developed by the sine wave generator. Alternatively a visual determination of unbalance is obtainable with a stroboscopic light source which flashes at running frequency and suitable indicia on the body being balanced. Respective alternatives of this general type appear in respective U. S. Patents 2,315,578 and 2,165,024, each being assigned to the assignee of this invention. Further details with regard to such balancing systems may be had by reference to the mentioned patents. Inasmuch as this invention is directed to a subcombination of such equipment, namely, a suitable vibration detecting system applicable to the respective bearing supports, a complete system of this type has not been illustrated in the interest of simplicity.

In apparatus of the type hereinabove generally described, it is essential that the excitation of the vibration detector by the vibratory movement be essentially linear, in a mathematical sense, with respect to such vibratory movement and that the effect of unwanted vibrations due to causes other than unbalance shall be essentially eliminated from the system. Various methods have been proposed for minimizing the sensitivity of vibration detectors to unwanted vibrations. While some of these have been reasonably effective in minimizing detection of unwanted vibration, these as a general rule involve a fairly complicated mounting structure.

Accordingly, it is a primary object of this invention to provide a vibration detecting apparatus of the type generally referred to which is simple in its elements, effective in operation, and inexpensive to manufacture.

Another object of this invention is to provide a vibration detecting apparatus which is responsive to vibratory movement along a single path and which for all practical purposes is substantially insensitive to unwanted sources of vibration.

These and other objects will become apparent upon a study of the following disclosure when considered in conjunction with the accompanying drawings, in which.

Figure 1:
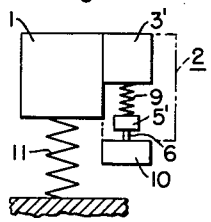
Figures 1 through 3 are schematic illustrations of different embodiments of this invention.
Figure 7:
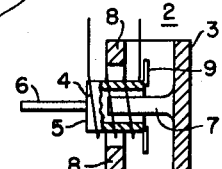
Fig. 7 illustrates one type of vibration detecting device which may be utilized in practicing this invention.

The embodiment of the invention illustrated in Fig. 1 covers a vibration detecting or measuring apparatus wherein the vibratory movement of a body or mass 1 is to be detected. In detecting or measuring this vibration, a vibration detecting or measuring device, for example, of the type illustrated in Fig. 7 and generally designated 2 in both Figs. 1 and 7, is mounted directly to the body which is vibrating.

A pickup of this general type may embody a body portion 3 of magnetizable material. This body portion may be a permanent magnet having north and south poles so as to create a magnetic field which links the coil 4, or may be provided with a magnetizing coil, not shown, adapted for connection to a supply of constant direct current. This magnet structure is relatively massive compared with the mass of the coil 4 and the coil form 5 and in some applications, is spring mounted on the base of the balancing machine adjacent to and in the path of movement of one of the bearing supports, in which position the prod 6 extending outwardly from the coil form engages the bearing support and is vibrated back and forth through the magnetic field extending between the center core section 7 and the outer legs 8 as seen in Fig. 7. This movement of the coil 4 through the magnetic field generates a voltage proportional to the velocity of the motion, and, hence, the voltage is indicative of the vibratory movement of the bearing support.

In Fig. 1, the body portion of the vibration detector which includes the permanent magnet 3 and such housing, not shown, as may be provided therefore, is designated 3', and is represented by a simple block which is securely attached to the vibrating body 1. The mass of the coil and its support and such other items appertaining items as may be a part of this structure is represented in the block 5'. In this application, a spring 9 is utilized to connect the coil structure with the magnet structure. It will be appreciated from this illustration that no attempt has been made to cover the specific physical relationship of the coil structure with the magnet structure. This relationship, however, will be apparent from and understood by reference to Fig. 7.

A mass 10 is connected to the movable member 5', thus thereby appreciably increasing the mass of this member. The relationship of the combined mass of the mass 10 and the mass of the movable member 5' constituting the coil and coil form assembly with respect to the spring constant 9 is such as to provide a resonant frequency which is substantially below the operating frequency range of the vibrating body 1, so that there will be no chance of vibration resonance occurring in the vibration detector system over this operating range.

The vibrating body 1 is illustrated as being supported upon a spring 11. Physically, however, this spring may represent the spring constant, for example, of the frame of a machine or of the bearing mounting of a particular rotor in a machine, rather than an actual spring such as shown in any one of Figs. 1 through 6.

In the arrangement shown, vibration of the body 1 along a vertical path as viewed results in displacement of the body portion 3' of the vibration detector therewith. In view of the total mass of the movable member 5' and the mass 10 connected thereto, this assembly tends to remain stationary in space, and as a consequence, the spring 9 is deflected alternately in extension and compression and relative movement between the relatively movable parts of the vibration detector results. This relative movement, as described in connection with Fig. 7, will result in the production of a voltage which is indicative of the vibratory movement of the vibrating body 1.

Figure 4:
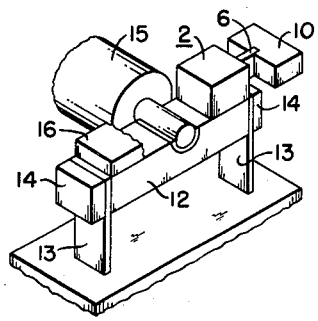
Figs. 4 through 6 are perspective illustrations of specific applications of the respective general embodiments illustrated in Figs. 1 through 3.

While this general principle of vibration detection has been described in connection with vibration limited essentially to a vertical plane, it will be appreciated that this principle of vibration detection is applicable also to other planes. An arrangement for detecting vibrations in a horizontal plane by this method is illustrated in Fig. 4, where a fragmentary portion of one bearing support of a balancing machine is illustrated in perspective. In this illustration, parts corresponding to those of Fig. 1 bear like reference characters.

The apparatus shown in Fig. 4 comprises a bearing support 12 which is supported at its extremities at the upper ends of a pair of flat leaf springs 13. The upper ends of these springs are secured to the ends of the bearing support 12 by suitable clamping plates 14, while the bottom ends of these springs 13 are secured to the base of the machine in any suitable manner. A rotor 15, which is to be balanced, is positioned with the shaft at one end thereof in the bearings support 12. This bearing support may be a split type of bearing involving a top bearing half 16 which is only fragmentarily shown in the interest of simplicity, and which functions to securely lock the shaft in the bearing support. The shaft at the other end of the rotor (not shown) is similarly supported.

In this application the vibration detector 2 is secured directly to the bearing support 12 to move therewith. The prod 6 projects from the right end thereof and a mass 10 is secured to the end of the prod. By reason of the mounting of the bearing support 12 on the flat leaf springs 13, vibratory movement is confined essentially to a single path which extends longitudinally of bearing support 12. As a consequence, the vibration detector 2 is moved therewith.

However, the mass 10 exerts a force on the prod 6 and the coil support connected therewith in dependence of the acceleration of the support 12. This results in displacement between the coil and the magnet structure of the vibration detector at a velocity corresponding to the velocity of the vibratory movement, and results in the generation of the voltage indicative of the vibratory movement.

Figure 2:
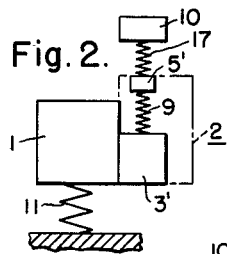

In a second embodiment of this invention as shown in Fig. 2, parts corresponding to those of Fig. 1 again bear like reference numerals. In this illustration, the body portion 3' of the vibration detector 2 is again secured to the vibrating mass 1, and the coil and coil form structure represented in the movable mass 5' is connected to the magnet structure 3' by means of the spring 9. However, the mass 10 in this embodiment is connected to the movable member or mass 5' by means of a spring 17. Spring 17 supports the mass 10 in the path of movement of the vibration detector. As in the case of Fig. 1, the mass 10 is appreciably greater than the mass 5' and for the instant application, the spring 17 is appreciably stiffer than the spring 9. With this arrangement, the mass 10 again tends to maintain a stationary position in space and as a consequence relative displacement between the vibration detector body portion 3' and the mass 5' is obtained by forces applied thereto through the spring 17. As in the previous cases this relative movement results in a voltage which is indicative of the vibratory movement.

Figure 5:
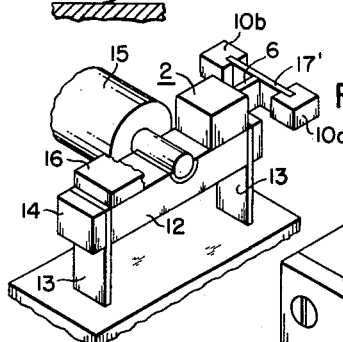

While the vibratory system of Fig. 2 is applicable in detecting vibratory movement of the body 1 in a vertical plane, this principle may also be practiced in an arrangement such as illustrated in Fig. 5, in which the detection of vibratory movement is made in a horizontal plane. It will be appreciated that this figure is similar in many respects to that of Fig. 4. Consequently, parts of Fig. 5 corresponding to those of Fig. 4 have been given like reference characters.

In this application, the vibration detector generally designated 2 is again secured to the bearing support 12, which as in the case of Fig. 4, is limited for vibratory movement in a path substantially parallel to its longitudinal dimension. A flat leaf spring 17' is secured to the end of the prod 6 of the vibration detector in a position substantially perpendicular to the longitudinal axis of the prod. Masses 10a and 10b are secured at the ends of the flat leaf spring 17'. Masses 10a and 10b represent a symmetrical arrangement resulting in the application of balanced forces to the prod 6. It is to be appreciated, however, that some applications, depending upon the characteristics of the vibration detector and the manner in which force may be applied thereto to achieve relative movement of the components thereof, may not require the symmetrical distribution of mass which has been shown. The function of this system is essentially the same as that described in connection with Fig. 2.

Figure 3:
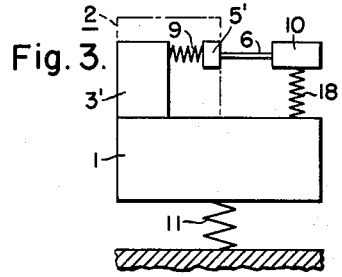

In the embodiment of the invention illustrated in Fig. 3, vibration detection is made in a horizontal plane. In this application, the mass 1 is mounted upon a spring 11 for movement back and forth along a single horizontal path. The body portion 3' of the vibration detector 2 is again secured to the mass 1, and the mass 5' of the movable member of the detector and other items connected thereto is connected to the body portion 3' by means of the coupling spring 9. A mass 10 is directly connected in the path of movement of the vibration detector to the mass 5' by means of the prod 6. A spring 18 supports the mass 10 on the vibrating body 1.

In this application, mass 10 tends to remain stationary in space as body 1 vibrates along the mentioned single horizontal path because the relationship of the combined masses 5' and 10 together with combined spring constants 9 and 18 produces a resonant frequency well below the operating frequency. As a consequence, the mass 5' is held in relatively fixed position due to its physical connection with the mass 10 and therefore relative movement between the mass 5' of the vibration detector and the body portion 3' occurs to produce a voltage indicative of the vibratory movement.

Figure 6:
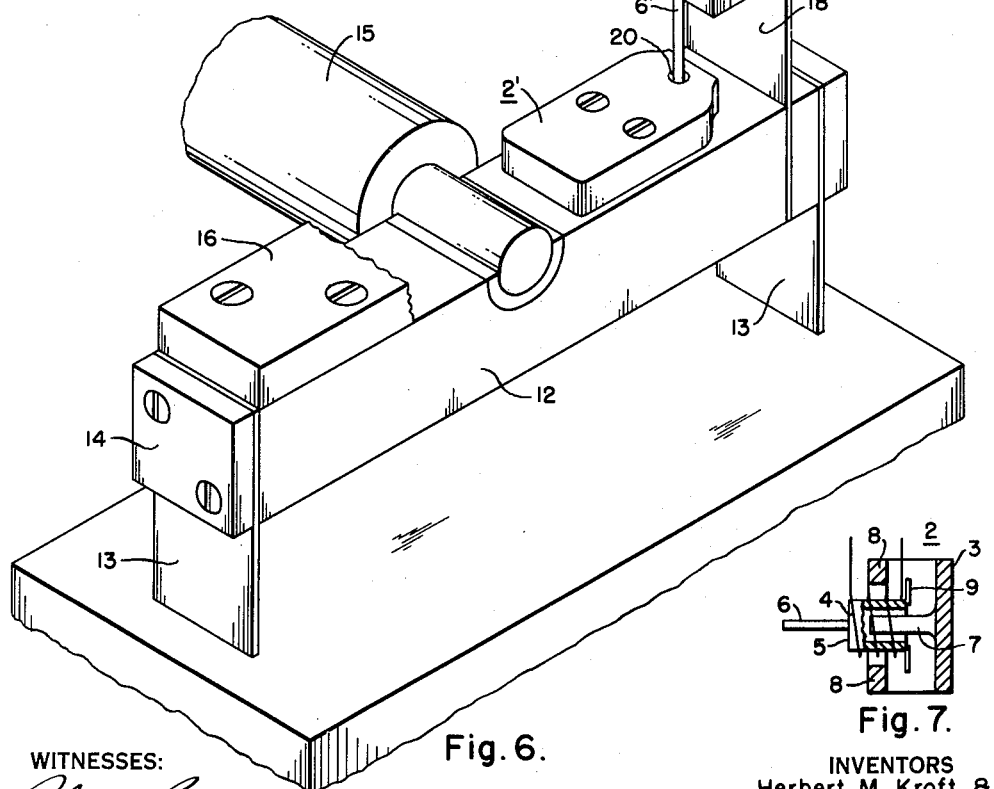

A practical application of this vibration detection principle of Fig. 3 appears in Fig. 6, which in many respects corresponds to that of Figs. 4 and 5, and consequently in such respects, the parts thereof are correspondingly numbered. In this application, the mass 10 is supported at the upper end of a flat leaf spring 18', which at its lower end is secured to the bearing support 12. The vibration detector 2' illustrated in this figure may be one of the numerous varieties of piezo-electrical crystal detectors. These crystals have the property of producing small electric voltages when stressed. The details of this crystal detector are not shown since they are well-known to the art. The prod 6' is securely clamped to the mass 10 by means of a clamping plate 19 which clamps the prod between the mass and the clamping plate. The prod 6' projects downwardly through an opening 20 in the upper side of the casing of the vibration detector 2' into a position providing suitable mechanical connection with the crystal therein. As the bearing support 12 vibrates, back and forth along the single path which essentially parallels the longitudinal dimension of the support, the inertia of the mass 10 tends to keep the mass in fixed position in space, both in respect to rectilinear and rotational displacements. As a consequence, the prod 6' tends to remain in a stationary vertical position throughout the range of relative displacement between the bearing support 12 and the mass 10. As a consequence, the lower end of the prod 6' at its point of connection with the mentioned crystal is effective to apply forces to the crystal in dependence of the vibratory displacement of the bearing support 12. The voltage produced in this manner is again indicative of the vibratory movement of the support 12.

It will be appreciated that this invention may be practiced with other physical arrangements than those illustrated herein, while yet involving a suitable type of pickup device, in which the body portion of the pickup is secured to a structure such as bearing support 12 or the body 1 which is subjected to vibration, the mode of which is to be detected. The type of vibration detector which is employed is immaterial to the general principles herein involved, and may include in addition to the coil and magnet type and the piezo-electric crystal type herein discussed, such types as variable resistance, variable reluctance, variable capacitance and other suitable detectors which may be available. All of such devices produce a signal or respond to the relative motion between the yieldable section or probe and the main body portion to which it is coupled.

The application of vibration detector arrangements such as hereinabove disclosed to systems of the type generally discussed in the opening statements of this specification for balancing rotating bodies simplifies such structures to a considerable extent by eliminating parts and reducing overall size of the complete assembly. Additionally, these structures permit the use of non-special, small, high output, easily obtainable vibration detectors such as those commonly used on radio-phonographs. In some applications to balancing machines in which the specific mounting of the pickups as herein disclosed are made directly to the bearing support, it may be feasible to substitute simple shock mounts for the flat leaf springs 13 which mount the bearing support. By mounting the vibration detectors or pickups directly on the bearing support, the work handling area can be reduced, which tends to keep the size of the machine at a minimum. Moreover, with the use of small high output vibration detectors or pickups, less amplification is required which reduces the electrical cabinet area. Since the bearing support and vibration detector now constitute a unit assembly, mechanical adjustment for rotors of various lengths is facilitated.

The foregoing disclosure and the showing made in the drawing are merely illustrative of the principles of this invention and are not to be interpreted in a limiting sense.

We claim as our invention:

1. Vibration detecting apparatus comprising, a support adapted for engagement with a vibrating body, spring mounting means mounting said support for movement along a single path, a vibration detecting device having a body portion secured to said support to move therewith, an actuating prod movable relative to said body portion, a member carried by but movable with respect to said body portion and connected to said prod for movement thereby, said actuating prod being disposed substantially at right angles to said path of movement, and means for effecting displacement of said prod relative to said body in response to acceleration of said support along said path of movement comprising a mass, flat spring means supporting said mass on said support in a position laterally displaced from said path of movement, the plane of said flat spring means being substantially at right angles to said path of movement, and means connecting said prod to said mass, said prod being displaced from the plane of said flat spring means.

2. Vibration detecting apparatus comprising, a support adapted for engagement with a vibrating body, spring mounting means mounting said support for movement along a single path, a vibration detecting device having a body portion secured to said support to move therewith, an actuating prod movable relative to said body portion, a member carried by but movable with respect to said body portion and connected to said prod for movement thereby, said actuating prod being disposed substantially at right angles to said path of movement, and means for effecting displacement of said prod relative to said body in response to acceleration of said support along said path of movement comprising a mass having a pair of spaced substantially parallel faces, a flat spring fastened at one end to said support and at the other end to one face of said mass, the plane of said flat spring being disposed substantially at right angles to the path of movement of said support, said mass being disposed in a position laterally displaced of said path of movement, and means connecting said prod to the other of said faces of said mass.

3. Apparatus for detecting unbalance in a rotatable body comprising, a movable support for rotatably mounting a body and movable along a single path, a vibration detecting device comprising a body portion secured to said support, an actuating prod movable relative to said body portion, a member carried by but movable with respect to said body portion and connected to said prod for displacement thereby, said actuating prod being disposed substantially at right angles to said path of movement, a mass connected to said prod and spring means mounting said mass on said support in a position to permit relative motion of the mass and the support in the dirction of vibration to apply force to said prod in dependence of motion of said support.

4. Apparatus for detecting unbalance in a rotatable body comprising, a support for rotatably mounting a body, flat leaf spring means flexibly mounting said support for movement along a single path, a vibration pickup having a body portion secured to said support, an actuating prod movable relative to said body portion, a member carried by but movable with respect to said body portion and connected to said prod for displacement thereby, said actuating prod being disposed substantially at right angles to said path of movement, a mass connected to said prod, and a flat leaf spring connecting said mass to said support in a position for movement relative to said support in the direction of vibration to apply force to said prod in dependence of motion of said support.

5. Apparatus for detecting unbalance in a rotatable body comprising, a support for rotatably mounting a body, flat leaf springs flexibly mounting said support for movement along a single path, a vibration detection device having a body portion secured to said support, an actuating prod movable relative to said body portion, a member carried by but movable relative to said body portion and connected to said prod for displacement thereby, said actuating prod being disposed substantially at right angles to said path of movement, a mass connected to said prod, and a flat leaf spring connected to said mass at one point and to said support at a second point and occupying a position with the plane thereof substantially parallel to the plane of said first named flat leaf springs, said last named flat leaf spring positioning said mass to permit relative motion of the mass and the support in the direction of vibration to apply force to said prod in dependence of motion of said support.

References Cited in the file of this patent

UNITED STATES PATENTS

| 1,902,184 | Rieber | Mar. 21, 1933 |
| 2,165,024 | Baker et al. | July 4, 1939 |
| 2,331,160 | Baker et al. | Oct. 5, 1943 |
| 2,363,373 | Werner | Nov. 21, 1944 |
| 2,487,035 | Weaver | Nov. 1, 1949 |